Oct. 4, 1938.  L. A. STAHMER  2,131,984

POULTRY FEEDER

Filed April 29, 1936  2 Sheets-Sheet 1

Inventor:
Louis A. Stahmer
By: Milo B. Stevens & Co.
Atty's.

Oct. 4, 1938.  L. A. STAHMER  2,131,984
POULTRY FEEDER
Filed April 29, 1936  2 Sheets-Sheet 2
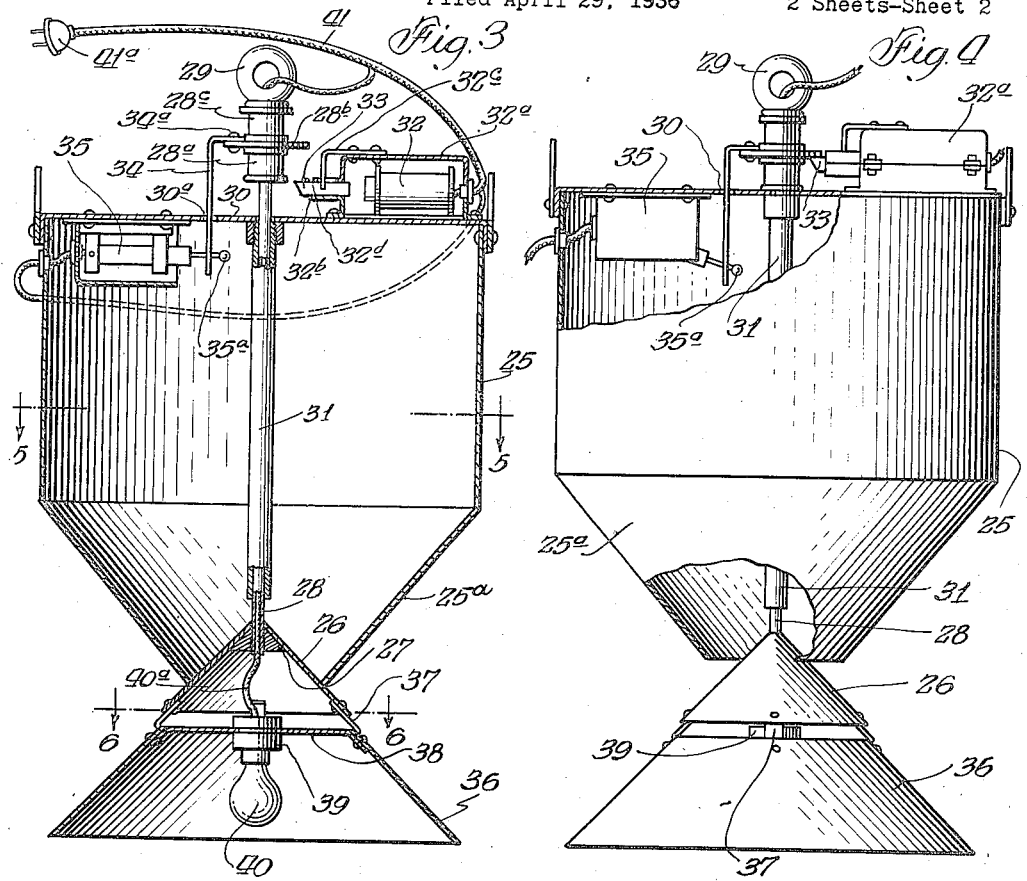
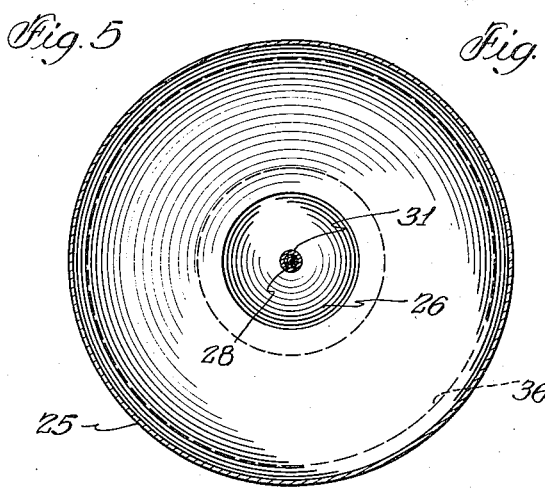
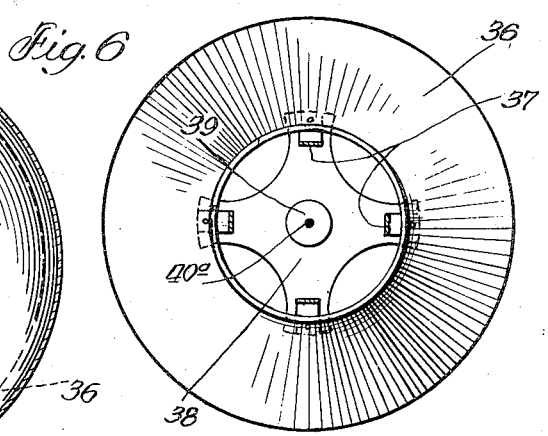
Inventor:
Louis A. Stahmer
By: Milo B. Stevens & Co.
Atty's.

Patented Oct. 4, 1938

2,131,984

UNITED STATES PATENT OFFICE 2,131,984

POULTRY FEEDER

Louis A. Stahmer, Forest Park, Ill.

Application April 29, 1936, Serial No. 77,047

5 Claims. (Cl. 119—56)

My invention relates to devices for feeding poultry, and is an improvement over a device of this kind patented by me on April 17, 1906 under Number 817,884.

In contemplating the improvement, I have not only provided structural values and departures, but also incorporated a device to illuminate the hen house or other enclosure in which the poultry roost and feed, so that the improved apparatus serves a double purpose.

The illumination of quarters in which poultry are kept during seasons when the nights are long or periods of the day are dark has been found of material benefit during recent years. Particularly has this been true when the quarters are lighted at feeding time, since the light has been found to improve the laying tendency or capacity of the hens to the extent that the seasonal egg yield per hen is materially increased.

It is therefore one object of my improvement to produce an article in a single unit which serves both the feeding and lighting purposes in the same zone.

A further object of the improvement is to provide a control for the composite device which accomplishes the delivery of the feed and the lighting of a lamp in one action.

A still further object of the improvement is to control the delivery of the feed and the lighting of the lamp electrically. Another object of the improvement is to include in the electrical circuit a means for cutting off the current from the feed delivery device in order to avoid damage to the same.

An additional object of the improvement is to incorporate in the device a reflector capable of spreading the light from the lamp over a large area.

An important object of the improvement is to construct the same along lines of simplicity and compactness, whereby to be inexpensive to manufacture and handy to carry, install and use.

With the above objects in view and any others which may suggest themselves from the description to follow, a better understanding of the improvement may be had by reference to the accompanying drawings, in which—

Fig. 3 is a vertical section;

Fig. 4 is an elevation, partly in section, showing vital parts in changed positions;

Figure 1:
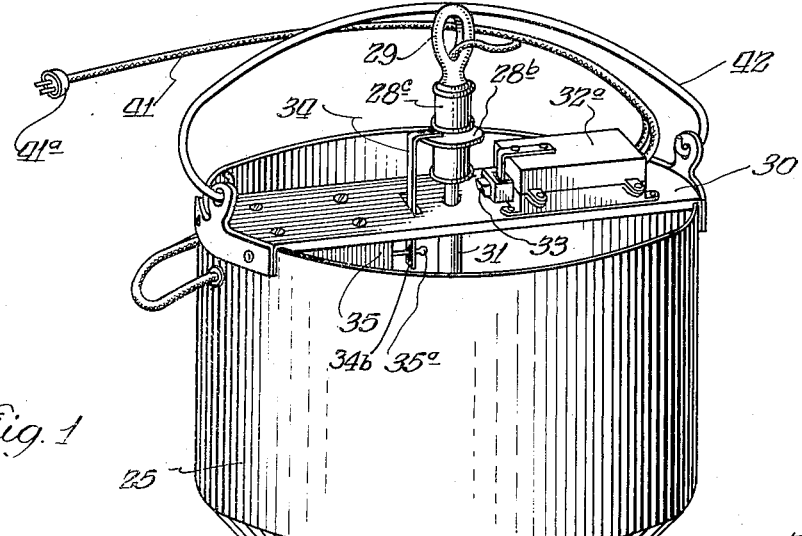
Fig. 1 is a perspective view of the novel poultry feeder ready for installation.
Figure 7:
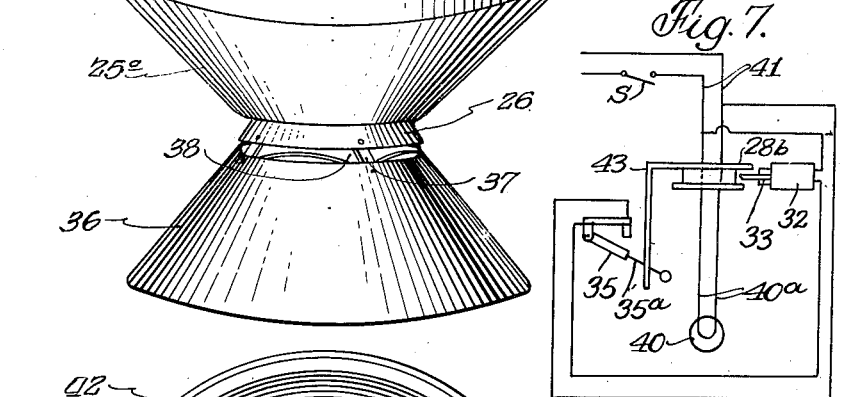
Figure 2:
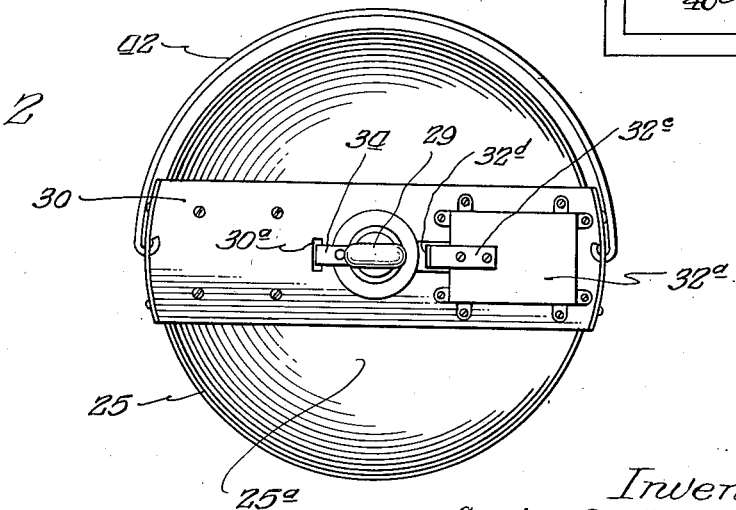
Fig. 2 is a top plan view with the wiring removed.

Figs. 5 and 6 are, respectively, sections on the lines 5—5 and 6—6 of Fig. 3; and Fig. 7 is a diagrammatic showing of the wiring for my device.

By specific reference to the drawings, it is seen that the device consists essentially of a hopper 25 having a converging bottom 25a which opens downwardly in the center to receive a conical valve 26 as a closure. The valve 26 is carried by a reinforcing block 27 within the apex of the valve. The block 27 is screwed on the lower end of a tube 28 which rises vertically through the center of the hopper to a point above the same, receiving a ring-shaped head piece 29 at the top. The top of the hopper is spanned by a plate 30 which carries a depending center tube 31 in which the tube 28 is slidable. As so far described the device is similar to the one in my said patent to the extent that the valve 26 is lowered by the dropping of the tube 28 at a desired time, resulting in the issue of the feed from the bottom of the hopper with a conical spread, whereby to cover a large area.

While the control of the feed delivery valve in my patent operated directly by the timed action of an alarm clock, such a control is equally applicable to the improved device, but preferably at a distance. By making the control electrical, it may be put in action either by a clock mechanism in the farm house or by the voluntary use of a hand switch therein. Whichever actuating element may be chosen, the electrical circuit creates the desired effect through the agency of an electro-magnet 32. The armature of the latter is in the form of a latch bolt 33 which normally maintains the delivery valve 26 in closed position by supporting a nut 28a screwed on the upper portion of the tube 28, as seen in Fig. 3. It follows, therefore, that upon the operation of the timed mechanism or the hand switch previously referred to, the latch bolt will be drawn outward by the magnet to release the nut 28a and allow the valve 26 to drop. A limit for the dropping action is presented by a stop plate 28b secured on the tube 28 between the nut 28a and a second nut 28c above the same. As indicated in Fig. 4, the latch bolt 33 provides a rest for the stop plate 28b when the drop of the valve 26 has taken place. The drop can also be regulated by turning the reinforcing block 27.

The electro-magnet is contained in a suitable housing 32a, provided with an extension 32b for the guidance of the latch bolt 33. The housing also carries a spring 32c which engages the bolt after passing into a slot 32d in the guide 32b, the function of the spring being to normally retain the bolt in a forward or advanced position, it being understood that the spring becomes tensioned during the retraction of the bolt.

When the feed valve 26 has once been dropped, it is no longer necessary that the electric current maintain the latch bolt 33 in the retracted position and cause possible damage to the windings of the electro-magnet. I therefore cause the current to be automatically cut off as the valve drops. This is done by the action of an arm 34 secured to the stop plate 28b by rivets 34a depending into the hopper 25 by way of an opening 30a in the top plate 30. The arm 34 is preferably slotted near the bottom, as indicated at 34b for the free passage of the lever 35a of a standard knife safety switch 35 secured on the under side of the plate 30. Fig. 4 shows the swing of the lever 35a from the normal position illustrated in Fig. 3 to accomplish the cut off of the current to the electro-magnet.

The valve 26 forms the summit of a wider base 36 which is spaced downwardly from the lower end of the cone. The base 36 is secured to the valve by suitable connecting strips 37; and the top of the base is reinforced by a horizontal spider 38. The latter carries an electrical socket 39 for a pendent lamp 40, the wiring 40a for the lamp rising through the tube 28 to join the cable 41 leading to the electro-magnet 32 and the switch 35, and the outer extremity of the cable carries the usual plug 41a which is applicable to the standard current outlet.

As indicated in the wiring diagram of the circuit illustrated in Fig. 7, it is seen that the lamp 40 is directly controlled from the original clock work or other timing device or hand switches. Thus, the moment the feed delivery is actuated, the lamp becomes lighted and remains so until the original switch is operated to turn it off. Thus, the large area through which the feed has been scattered is constantly illuminated by the lamp, so that the poultry may get into action to find their food and thus receive the exercise necessary for their proper condition. By being fed in the light, the effect on the hens is conducive to the stimulation of their laying tendencies, so that the yield of eggs during the darker winter periods compares favorably with that during the summer or daylight periods.

Where poultry is being raised on a commercial basis, it is feasible to install a large number of the novel feeders in various places within the enclosure in which the hens are kept, and all the units may be controlled from one source. Each unit carries a bail 42 by means of which it may be hung to whatever height will best serve its purpose. Thus, the higher the unit the larger the spread of the feed and the area illuminated; as many units may be used as there are pens or divisions in the enclosure. In the improved structure the plate 30 is only wide enough to accommodate the electro-magnet housing, the balance of the hopper top being left open. However, in case it is desirable that the hopper be fully closed at the top, it is an easy matter to extend a pair of lid sections hingedly from the sides of the plate 30 to the rim of the hopper. The interior of the base 36 is highly polished or plated or painted to serve as a reflector; and the said base is spaced from the valve 26 in order that the heat from the lamp may be dissipated before it reaches the valve or the hopper and so have no detrimental effect on the feed passing through the valve. Also, the ventilation so secured prevents the wiring 40a from becoming unduly heated, and prevents short-circuits which would put out the lamp or form a fire hazard by the falling sparks into the inflammable litter generally used in poultry houses. The heat from the lamp and the socket rises and can escape sidewise through the annular opening above the base 36. Also, the light from the lamp can pass through said opening when the feeder discharges to illuminate the perches and arouse the occupants thereof to activity.

The function of the ring-shaped head piece 29 is to pull up the valve 26 when the hopper is to be refilled, this action causing the nut 28a to trip the latch bolt 33 and reassume a position atop said bolt to keep the valve closed. Also, this action causes the lever 34a of the toggle switch 35 to be raised to reclose the corresponding part of the circuit. The outer tube 31 is not only a guide for the tube 28, but also keeps the hopper contents from crowding or packing about the tube 28, thus insuring the free action thereof.

It will be evident from the above description that I have made a distinct departure in the improved device over my patented structure. The device can now be fully controlled and operated from a handy place in the home or farm house, and its action is instantaneous because of the electrical mode of operation by the electro-magnet or a solenoid, if desired. Further, it is seen that the illuminating lamp and its reflector are centrally and compactly applied, whereby to extend directly from the feeder, and at the most advantageous point for purposes of illumination.

It will be evident also that by spacing the upper edge of the spreader 36 radially outward from the lower edge of the valve 26 that some at least of all of the feed passing down the valve will fall through the annular space thus formed and drop to the ground inwardly of the lower edge of the spreader to form thereat an unbroken ring of feed inwardly of a like ring formed by the rest of the feed dropping off of the lower edge of the spreader. By displacing the upper edge of the spreader 36 slightly below the lower edge extended of the valve 26, most of the feed passing down the valve will "jump" the annular opening and continue down the spreader. At the same time a lesser portion of the feed will fall through the opening as aforesaid. By this arrangement a better and wider distribution of feed is achieved without increasing the size of the device. Thereby more fowls can be fed with less crowding. Yet, the improvements are relatively simple and of a design feasible of production or assembly by standard methods and without undue complications or accuracy. The device is of a character to be handily carried about and suspended wherever required and at the most advantageous height. Finally, the utility of the device should be easily evident to poultry raisers, since it more than compensates for its added cost over the form shown in my patent.

I claim:

1. A poultry feeder comprising a hopper, a closure valve at the bottom thereof, electrically controlled means to release said valve to permit it to open, said valve being adapted to open by gravity, and said means including an electrical circuit, an electro-magnet, a latch bolt serving as the armature for the electro-magnet, a projection of the valve supported by the latch bolt, the latter being attracted by the electro-magnet when the circuit is closed to unseat the projection and allow the valve to drop to open position, and a higher projection carried by the valve and of a length to rest on the retracted latch bolt when the valve has dropped to a predetermined height, whereby to stop the valve from falling below such height.

2. A poultry feeder comprising a hopper, a closure valve at the bottom thereof, a lamp below said valve, a diverging reflector for said lamp, said lamp and reflector being spaced from said valve in a downward direction, the closure valve being conical, a tube rising from the summit of the valve to a point above the hopper, and an electrical circuit for the lamp, the leads in said circuit which extend from the lamp rising through said tube.

3. A poultry feeder comprising a hopper, a closure valve at the bottom thereon, said valve being adapted to open by gravity, an extension of said valve, a projection on said extension of said valve, a latch bolt engageable with said projection to maintain said valve in a closed position, electrical means for disengaging said latch bolt from said projection to permit said valve to open, and a higher projection on said extension, said last named projection being adapted to engage said disengaged latch bolt when said valve has opened a predetermined degree and prevent further opening of said valve.

4. A poultry feeder comprising a cylindrical hopper, a converging bottom for said hopper, a centrally mounted conical valve forming a closure for said bottom, a diverging feed spreader, said spreader comprising a substantial extension of said valve but being spaced slightly therefrom in a downward direction to provide a substantially continuous annular space therebetween, the upper edge of said spreader being radially outward of the lower edge of said valve, and an electric light carried by said spreader centrally thereof.

5. A poultry feeder comprising a cylindrical hopper, a converging bottom for said hopper, a centrally mounted conical valve forming a closure for said bottom, a diverging feed spreader, said spreader comprising a substantial extension of said valve but being spaced slightly therefrom in a downward direction to provide a substantially continuous annular space therebetween, the upper edge of said spreader being radially outward of the lower edge of said valve and the outer surface of said spreader being displaced slightly below the surface of said valve extended.

LOUIS A. STAHMER.